(12) United States Patent
Halabian et al.

(10) Patent No.: US 9,445,427 B2
(45) Date of Patent: Sep. 13, 2016

(54) DOWNLINK RESOURCE ALLOCATION IN OFDM NETWORKS

(71) Applicant: Telefonaktiebolaget L M Ericsson (PUBL), Stockholm (SE)

(72) Inventors: Hassan Halabian, Ottawa (CA); Ioannis Lambadaris, Ottawa (CA); Ahmed Zainaldin, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 73 days.

(21) Appl. No.: 14/266,257

(22) Filed: Apr. 30, 2014

(65) Prior Publication Data

US 2015/0319772 A1 Nov. 5, 2015

(51) Int. Cl.
*H04W 72/12* (2009.01)
*H04L 5/00* (2006.01)

(52) U.S. Cl.
CPC ........ *H04W 72/1273* (2013.01); *H04L 5/0007* (2013.01); *H04L 5/0037* (2013.01); *H04W 72/1231* (2013.01); *H04W 72/1257* (2013.01)

(58) Field of Classification Search
CPC .......................... H04W 72/1273; H04L 5/0007
USPC ......................................................... 370/329
See application file for complete search history.

(56) References Cited

U.S. PATENT DOCUMENTS

| | | | |
|---|---|---|---|
| 6,917,812 B2 | 7/2005 | Damnjanovic | |
| 2009/0047987 A1* | 2/2009 | Li | H04W 72/1257 455/522 |
| 2010/0232374 A1* | 9/2010 | Ofuji | H04J 13/00 370/329 |
| 2011/0134812 A1* | 6/2011 | Senarath | H04W 72/1231 370/280 |
| 2011/0170513 A1* | 7/2011 | Seo | H04W 72/1284 370/329 |

(Continued)

FOREIGN PATENT DOCUMENTS

| | | |
|---|---|---|
| EP | 2472981 A1 | 7/2012 |
| WO | 2013127665 A1 | 9/2013 |

OTHER PUBLICATIONS

Mushtaq, M.S. et al. "QoS-Aware LTE Downlink Scheduler for VoIP with Power Saving." 2012 IEEE 15th International Conference on Computational Science and Engineering (CSE), Dec. 5-7, 2012, pp. 243-250.

(Continued)

*Primary Examiner* — Melvin Marcelo
*Assistant Examiner* — Peter Solinsky
(74) *Attorney, Agent, or Firm* — Coats & Bennett, PLLC

(57) ABSTRACT

A downlink scheduler schedules downlink transmissions to a plurality of user terminals over a shared downlink channel and allocates resources for the downlink transmissions. For making scheduling decisions, the downlink scheduler computes a resource metric to compare the available resources that are being allocated. The resource metric is based on the individual scheduling metrics of the user terminals. Allocation of the resources is performed in an iterative fashion. A first resource is selected based on the resource metric and allocated to a user terminal based on the corresponding individual scheduling metrics of the user terminals. The next resource is then selected and allocated. This allocation process continues until all RBGs are allocated, or until all user terminals are served. In one embodiment, the resource metrics for the remaining resources and individual scheduling metrics for the remaining user terminals are computed/recomputed during each iteration.

14 Claims, 5 Drawing Sheets

(56) References Cited

U.S. PATENT DOCUMENTS

| | | | |
|---|---|---|---|
| 2012/0008489 A1* | 1/2012 | Higuchi | H04L 5/0007 370/203 |
| 2012/0327779 A1* | 12/2012 | Gell | H04L 47/6275 370/238 |
| 2013/0148624 A1* | 6/2013 | Gil | H04W 72/1242 370/329 |
| 2013/0157678 A1* | 6/2013 | Kim | H04W 72/048 455/452.1 |
| 2013/0170469 A1* | 7/2013 | Yu | H04L 1/0003 370/330 |
| 2013/0223249 A1* | 8/2013 | Chuang | H04W 24/08 370/252 |
| 2013/0279425 A1* | 10/2013 | Balraj | H04B 7/0619 370/329 |
| 2013/0329826 A1 | 12/2013 | Andreozzi et al. | |
| 2014/0036862 A1* | 2/2014 | Lorca Hernando | H04W 72/085 370/330 |
| 2014/0064206 A1* | 3/2014 | Bao | H04W 72/1278 370/329 |
| 2014/0286219 A1* | 9/2014 | Siomina | H04J 11/0023 370/311 |
| 2014/0334394 A1* | 11/2014 | Liu | H04W 52/143 370/329 |
| 2015/0098415 A1* | 4/2015 | Chen | H04L 5/0035 370/329 |
| 2015/0195850 A1* | 7/2015 | Quan | H04L 1/18 370/329 |
| 2015/0223260 A1* | 8/2015 | Devi | H04W 28/20 455/509 |

OTHER PUBLICATIONS

Chadchan, S.M. et al. "A Fair Downlink Scheduling Algorithm for 3GPP LTE Networks." I.J. Computer Network and Information Security, Published Online May 2013 in MECS, pp. 34-41.

* cited by examiner

DOWNLINK RESOURCE ALLOCATION IN OFDM NETWORKS

TECHNICAL FIELD

The present disclosure relates generally to Orthogonal Division Frequency Multiplexing (OFDM) networks and, more particularly, to allocation of radio resources in OFDM networks for downlink communications.

BACKGROUND

In LTE systems, data is transmitted to the mobile terminals over a downlink transport channel known as the Physical Downlink Shared Channel (PDSCH). The PDSCH is a time and frequency multiplexed channel shared by a plurality of user terminals. During each 1 ms subframe, commonly referred to as a Transmission Time Interval (TTI), a scheduler at the base station schedules one or more user terminals to receive data on the PDSCH. The user terminals scheduled to receive data in a given TTI are chosen based on Channel Quality Indication (CQI) reports from the user terminals that indicate the instantaneous channel conditions as seen by the user terminals. When a user terminal is scheduled, the scheduler allocates resources for the downlink transmission to the user terminal. In general, it is desirable to allocate the resources to the user terminal with the best channel conditions in order to maximize system capacity. However, due to the frequency selectivity of the channel, allocating resources sequentially to the user terminals with the best channel conditions may not maximize system capacity.

SUMMARY

The present disclosure provides methods and apparatus for scheduling user terminals in an OFDM system. The scheduling approach implemented by embodiments of the present disclosure attempts to optimize scheduling decisions to maximize system capacity to the extent possible given the scheduling metric. The techniques described herein may be used in conjunction with any scheduling metric, such as maximum throughput and proportionally fair metrics.

To achieve more optimal scheduling decisions, a new metric referred to herein as the resource metric is introduced for comparing the available resources that are being allocated, i.e., for ranking the resources. The resource metric is based on the individual scheduling metrics of the user terminals and is used to determine the order in which the resources are allocated. Allocation of the resources is performed in an iterative fashion. A first resource is selected based on the resource metric and allocated to a user terminal based on the individual scheduling metrics of the user terminals. The next resource is then selected and allocated. This allocation process continues until all resources are allocated, or until all user terminals are served. In one embodiment, the resource metrics for the remaining resources and individual scheduling metrics for the remaining user terminals are computed/re-computed during each iteration.

Exemplary embodiments of the disclosure comprise methods of scheduling downlink transmissions to one or more user terminals in a wireless communication network. In one embodiment of the method, a base station computes an individual scheduling metric for each candidate user terminal for each available resource, computes a resource metric for each available resource based corresponding ones of the individual scheduling metrics, selects one of the available resources based on a comparison of the resource metrics, and schedules one of the candidate user terminals to receive a downlink transmission using the selected resource.

In some embodiments, the individual scheduling metric comprises an estimated throughput.

In some embodiments, the individual scheduling metric comprises a fairness metric.

In some embodiments, computing a resource metric for each resource based on the individual scheduling metrics comprises, for each resource, summing the corresponding the individual scheduling metrics of the candidate user terminals.

In some embodiments, selecting one of the available resources based on a comparison of the resource metrics comprises selecting the resource having the worst resource metric.

In some embodiments, scheduling one of the candidate user terminals to receive a downlink transmission using the selected resource comprises scheduling a downlink transmission on the selected resource to the candidate user terminal having the best individual scheduling metric for the selected resource.

In some embodiments, the method further comprises transmitting data to the scheduled user terminal using the selected resource.

In some embodiments, the method further comprises, after allocating a first one of the resources, iteratively scheduling transmissions to one or more subsequent user terminals by updating the individual scheduling metrics for each remaining candidate user terminal for each remaining resource; re-computing the resource metric for each remaining resource based on the updated individual scheduling metrics; selecting one of the remaining resources based on a comparison of the resource metrics; and scheduling one of the remaining candidate user terminals to receive a downlink transmission using the selected resource.

In some embodiments, the method further comprises transmitting data to the scheduled user terminals using the selected resource.

Other embodiments of the disclosure comprise a base station in a wireless communication network. One embodiment of the network node comprises a transceiver circuit for communicating with user terminals, and a processing circuit operatively connected to said transceiver circuits for scheduling downlink transmission to said user terminals. The processing circuit is configured to compute an individual scheduling metric for each candidate user terminal for each available resource, compute a resource metric for each available resource based on the individual scheduling metrics, select one of the available resources based on a comparison of the resource metrics, and schedule one of the candidate user terminals to receive a downlink transmission using the selected resource.

In some embodiments, to compute the individual scheduling metric, the processing circuit is configured to compute an estimated thoughput for each user terminal for each available resource.

In some embodiments, to compute the individual scheduling metric, the processing circuit is configured to compute a fairness metric for each user terminal for each available resource.

In some embodiments, to compute the resource metric for each resource, the processing circuit is configured to sum the corresponding individual scheduling metrics of the candidate user terminals.

In some embodiments, to select one of the available resources, the processing circuit is configured to select the resource having the worst resource metric.

In some embodiments, to schedule one of the candidate user terminals to receive a downlink transmission using the selected resource, the processing circuit is configured to schedule a downlink transmission on the selected resource to the candidate user terminal having the best individual scheduling metric for the selected resource.

In some embodiments, the processing circuit is further configured to transmit data to the scheduled user terminal using the selected resource.

In some embodiments, the processing circuit, after allocating a first one of the resources, is further configured to iteratively schedule transmissions to one or more subsequent user terminals by updating the individual scheduling metrics for each remaining candidate user terminal for each remaining resource, re-computing the resource metric for each remaining resource based on the updated individual scheduling metrics, selecting one of the remaining resources based on a comparison of the resource metrics, and scheduling one of the remaining candidate user terminals to receive a downlink transmission using the selected resource.

In some embodiments, the processing circuit is further configured to transmit data to the scheduled user terminals using the selected resource.

Other embodiments of the disclosure comprise a base station configured to compute an individual scheduling metric for each candidate user terminal for each available resource, compute a resource metric for each available resource based on the individual scheduling metrics, select one of the available resources based on a comparison of the resource metrics, and schedule one of the candidate user terminals to receive a downlink transmission using the selected resource.

In some embodiments, to compute the individual scheduling metric, the base station is configured to compute an estimated throughput for each user terminal for each available resource.

In some embodiments, to compute the individual scheduling metric, the base station is configured to compute a fairness metric for each user terminal for each available resource.

In some embodiments, to compute the resource metric for each resource, the base station is configured to sum the corresponding individual scheduling metrics of the candidate user terminals.

In some embodiments, to select one of the available resources, the base station is configured to select the resource having the worst resource metric.

In some embodiments, to schedule one of the candidate user terminals to receive a downlink transmission using the selected resource, the base station is configured to schedule a downlink transmission on the selected resource to the candidate user terminal having the best individual scheduling metric for the selected resource.

In some embodiments, the base station is further configured to transmit data to the scheduled user terminal using the selected resource.

In some embodiments, the base station, after allocating a first one of the resources, is further configured to iteratively schedule transmissions to one or more subsequent user terminals by updating the individual scheduling metrics for each remaining candidate user terminal for each remaining resource, re-computing the resource metric for each remaining resource based on the updated individual scheduling metrics, selecting one of the remaining resources based on a comparison of the resource metrics, and scheduling one of the remaining candidate user terminals to receive a downlink transmission using the selected resource.

In some embodiments, the base station is further configured to transmit data to the scheduled user terminals using the selected resource.

Embodiments of the disclosure result in more optimal scheduling that increases system capacity given the scheduling metric used for scheduling the user terminals.

DETAILED DESCRIPTION

Figure 1:
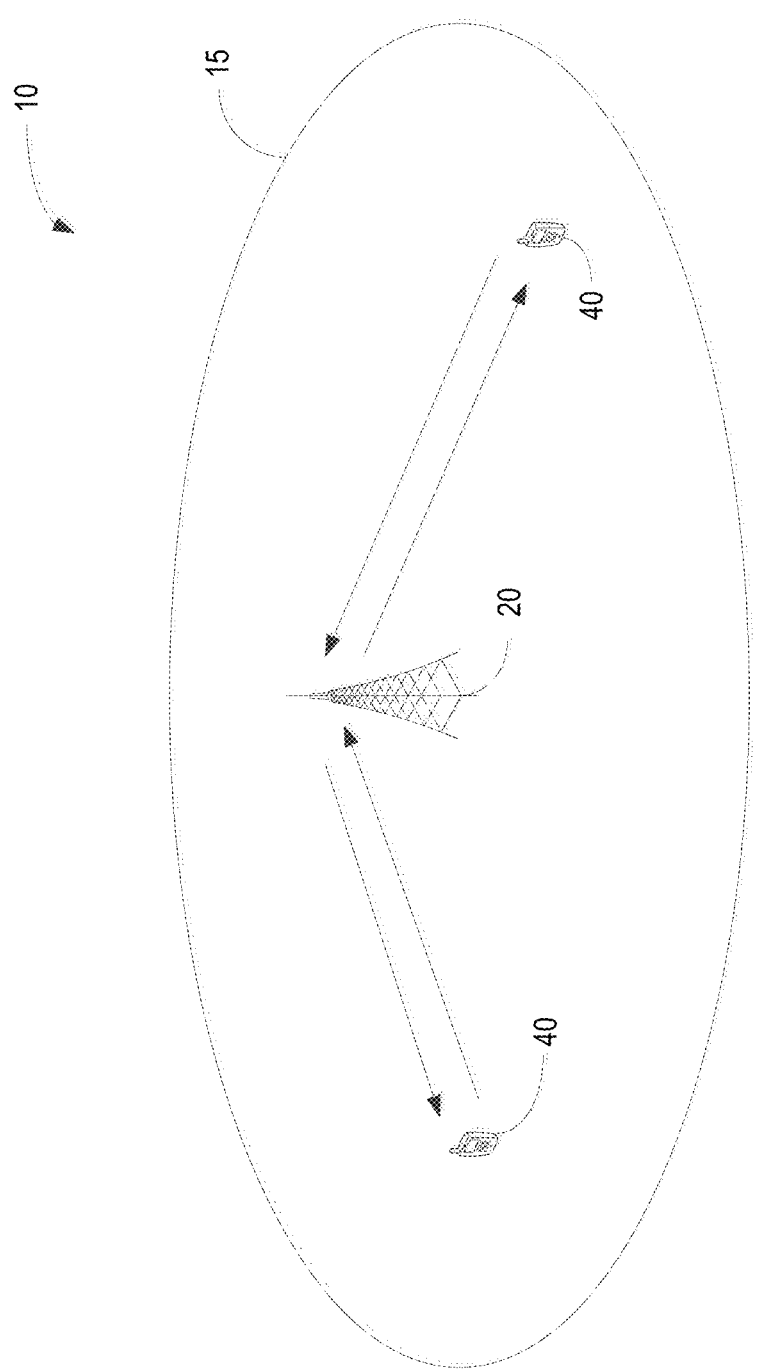
FIG. 1 illustrates a wireless communication network implementing the user scheduling and resource allocation techniques as herein described.

Turning now to the drawings, FIG. 1 illustrates an exemplary communication network 10 according to one exemplary embodiment of the present invention. The communication network 10 comprises a plurality of cells 15, though only one cell 15 is shown in FIG. 1. A base station 20 within each cell 15 communicates with the user terminals 40 within the cell 15. The base station 20 transmits data to the user terminals 40 over a downlink channel for downlink communications, and receives data from the user terminals 40 over an uplink channel for uplink communications.

For illustrative purposes, an exemplary embodiment of the present invention will be described in the context of a Long Term Evolution (LTE) system. Those skilled in the art will appreciate, however, that the present invention is more generally applicable to other wireless communication systems wherein a plurality of user terminals 40 receive downlink transmission over a shared downlink channel. For example, the present techniques may be adapted by a skilled practitioner for Wideband Code Division Multiple Access (WCDMA) networks, Worldwide Interoperability for Microwave Access (WiMAX) networks, and other networks using shared downlink channels.

Figure 2:
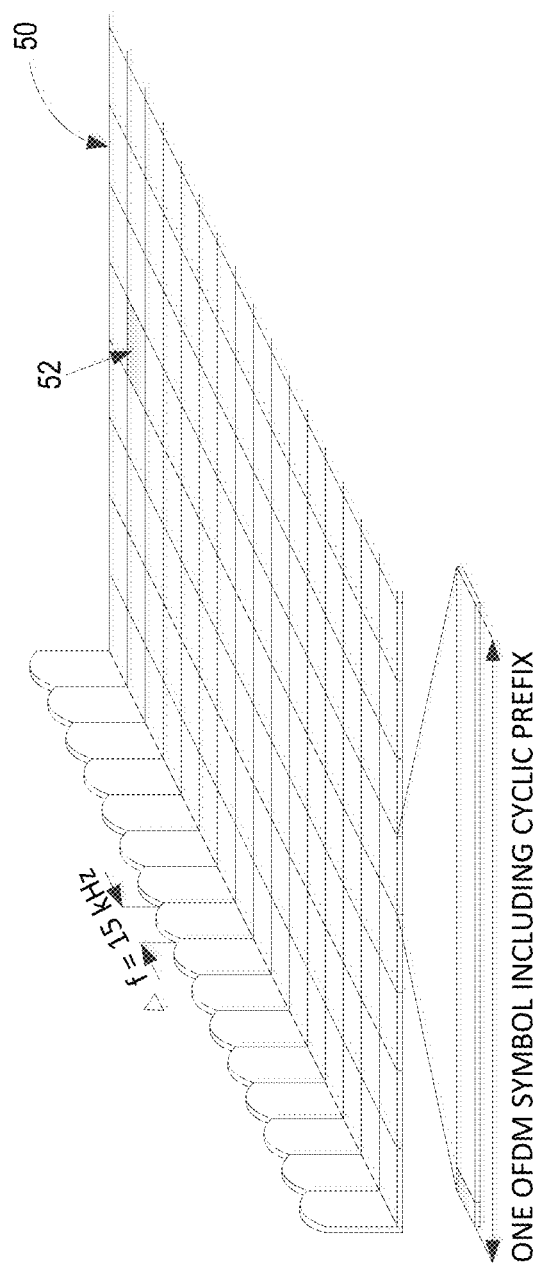
FIG. 2 illustrates an exemplary downlink physical resource in an exemplary LTE network.

LTE uses Orthogonal Frequency Division Multiplexing (OFDM) in the downlink and Single Carrier Frequency Division Multiple Access (SC-FDMA) in the uplink. The available radio resources in LTE systems can be viewed as a time-frequency grid. FIG. 2 illustrates a portion of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element 52. A resource element 52 comprises one OFDM subcarrier during one OFDM symbol interval.

In LTE systems, data is transmitted to the user terminals 40 over a downlink transport channel known as the Physical Downlink Shared Channel (PDSCH). The PDSCH is a time and frequency multiplexed channel shared by a plurality of user terminals 40. During each 1 ms subframe, commonly referred to as a Transmission Time Interval (TTI), a scheduler for the base station 20 schedules one or more user terminals 40 to receive data on the PDSCH. The user terminals 40 scheduled to receive data in a given TTI are chosen based on Channel Quality Indication (CQI) reports from the user terminals 40. The CQI reports indicate the instantaneous channel conditions as seen by the user terminals 40. The CQI reports may report CQI separately for different sub-bands. The base station 20 uses the CQI reports from the user terminals 40 and the buffer status for the user terminals 40 to select the transmission format for downlink transmissions. The transmission format includes, for example, the transport block size, modulation, and coding, which are selected to achieve a desired error performance.

In LTE and other OFDM systems, resource elements 52 are grouped for purposes of allocation into resource blocks (RBs). A RB comprises twelve adjacent subcarriers in the frequency domain, and one 0.5 ms slot (one half of one subframe) in the time domain. The RBs may be further grouped into resource block groups (RBGs). Each RBG comprises 1 to 4 contiguous RBs depending on the channel bandwidth. The resources may be allocated to the user terminals 40 in units of RBs or RBGs depending on the type of resource allocation. RBs and RBGs are referred to generically as resources. During each TTI, the scheduler at the base station 20 allocates the radio resources to individual user terminals. The resources may be allocated in units of RBs or RBGs.

Figure 3:
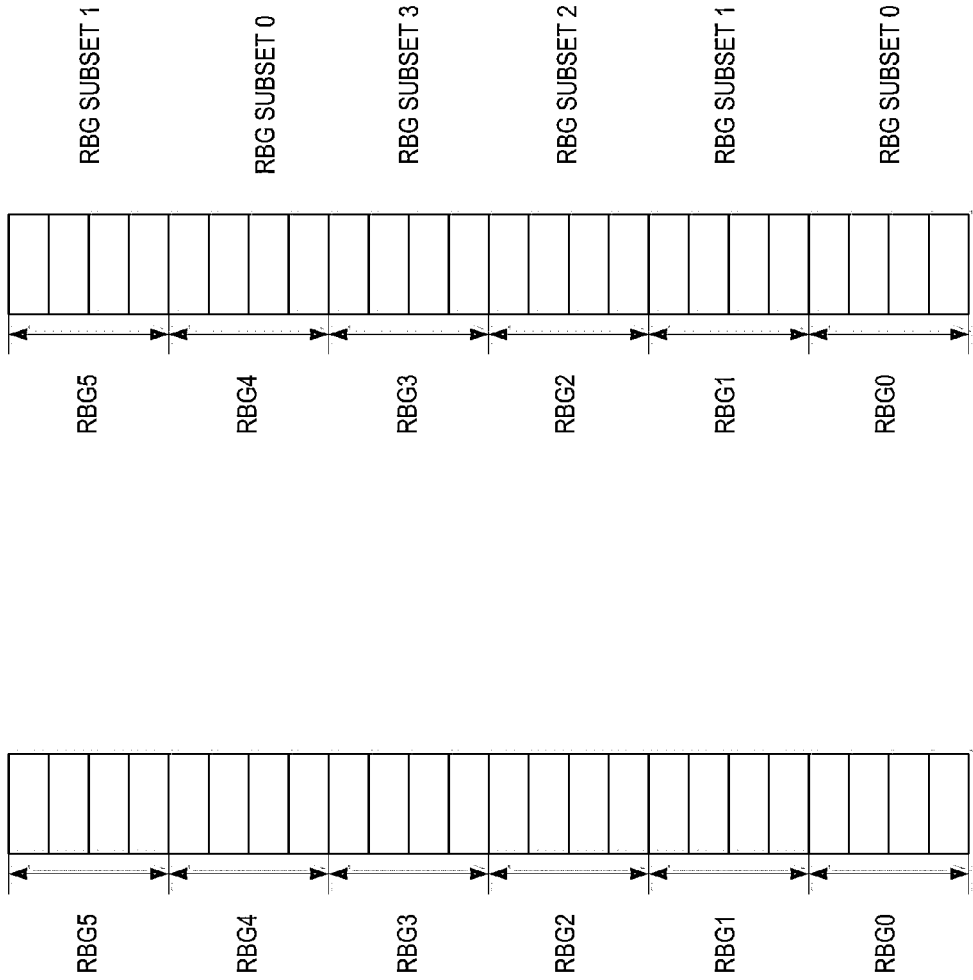
FIG. 3 illustrates examples of type 1 and type 0 resource allocation in an LTE network.

For type 0 resource allocation, the radio resources are allocated in units of RBGs. For type 1 resource allocation, the radio resources are allocated in units of RBs. Examples of type 0 and type 1 resource allocation are shown in FIG. 3, where the RBG size equals 4 resource blocks. With type 0 allocation, the radio resources are allocated in groups of 4 RBs, but the allocation does not need to be contiguous. In the example shown in FIG. 4, a user terminal 40 is allocated resource block groups 0, 3 and 4. With type 1 allocation, individual RBs are allocated to a user terminal 40. The allocated RBs are not required to be contiguous. Allocation of RBs may be restricted to a subset of RBGs rather than the full channel bandwidth.

To schedule the user terminals 60, the scheduler needs to determine which resources to allocate to which user terminals 40 in order to maximize the cell capacity and coverage while still meeting any Quality of Service (QoS) requirements and fairness criteria. In general, the scheduler 50 determines a scheduling metric for each candidate user terminal 40 and allocates resources (e.g., RBs or RBGs) to the user terminals 40 with the most favorable or "best" scheduling metric. What is deemed most favorable or "best" will depend on the nature of the scheduling metric used. If the goal is to maximize system capacity or throughput, it would be desirable to allocate the resources to the user terminals 40 with the most favorable channel conditions, i.e., highest estimated throughput. Allocating resources to user terminals 40 with the most favorable channel conditions allows higher data rates to be achieved, and hence greater system capacity. However, other factors, such as QoS requirements and fairness criteria may also be taken into account. Thus, the scheduling metric may be designed to maximize cell capacity while also meeting QoS requirements and fairness criteria.

Regardless of the scheduling metric that is used, scheduling typically proceeds by allocating resources to the user terminals 40 having the most favorable or "best" scheduling metrics. It should be appreciated that the scheduling metric may be computed on a per RB or per RBG basis. Thus, the user terminal 40 having the most favorable or "best" metric for one RB or RBG may not have the best metric for a different RB or RBG due to the frequency selectivity of the channel. This frequency selectivity makes the scheduling more difficult and often results in less than optimal scheduling decisions.

The scheduling approach implemented by embodiments of the present disclosure attempts to optimize scheduling decisions to maximize system capacity to the extent possible given the scheduling metric. The techniques described herein may be used in conjunction with any scheduling metric, such as maximum throughput and fairness metrics, i.e., proportionally fair metrics. To achieve more optimal scheduling decisions, a new metric referred to herein as the resource metric is introduced for comparing the available resources that are being allocated, i.e., for ranking the resources. A resource metric is associated with each RB or RBG and is based on the individual scheduling metrics of the user terminals 40. As will be hereinafter described in more detail, the resource metric is used to determine the order in which the resources are allocated. Allocation of the resources is performed in an iterative fashion. A first resource (e.g., RB or RBG) is selected based on the resource metric and allocated to a user terminal 40 based on the corresponding individual scheduling metrics of the user terminals 40. The next resource is then selected and allocated. This allocation process continues until all resources are allocated, or until all user terminals 40 are served. In one embodiment, the resource metrics and individual scheduling metrics are computed/re-computed during each iteration.

As one example, assume that the scheduler at the base station 20 is configured to use a maximum throughput metric and the channel bandwidth is divided into N RBGs. During each TTI, the scheduler calculates the estimated throughputs $T_{k,n}$ for each user terminal 40, where k is an index for the candidate user terminals 40 and n is an index for the available resources. The estimated throughputs $T_{k,n}$ comprise the individual scheduling metrics in this example. The scheduler then computes a resource metric R for each resource by summing the individual scheduling metrics corresponding to that resources. Thus, the resource metric $R_n$ for the $n^{th}$ resource is given by:

$$R_n = \sum_1^K T_{k,n}$$

where K equals the number of candidate user terminals 40. The scheduler selects the resource that minimizes the resource metric $R_n$, i.e., $\min(R_n)$. That is, the scheduler selects the resource having the least favorable or "worst" resource metric. Once the resource is selected, it is allocated to the user terminal 40 that maximizes $T_{k,n}$ for the selected resource, i.e., $\max(T_{k,n})$.

Figure 4:
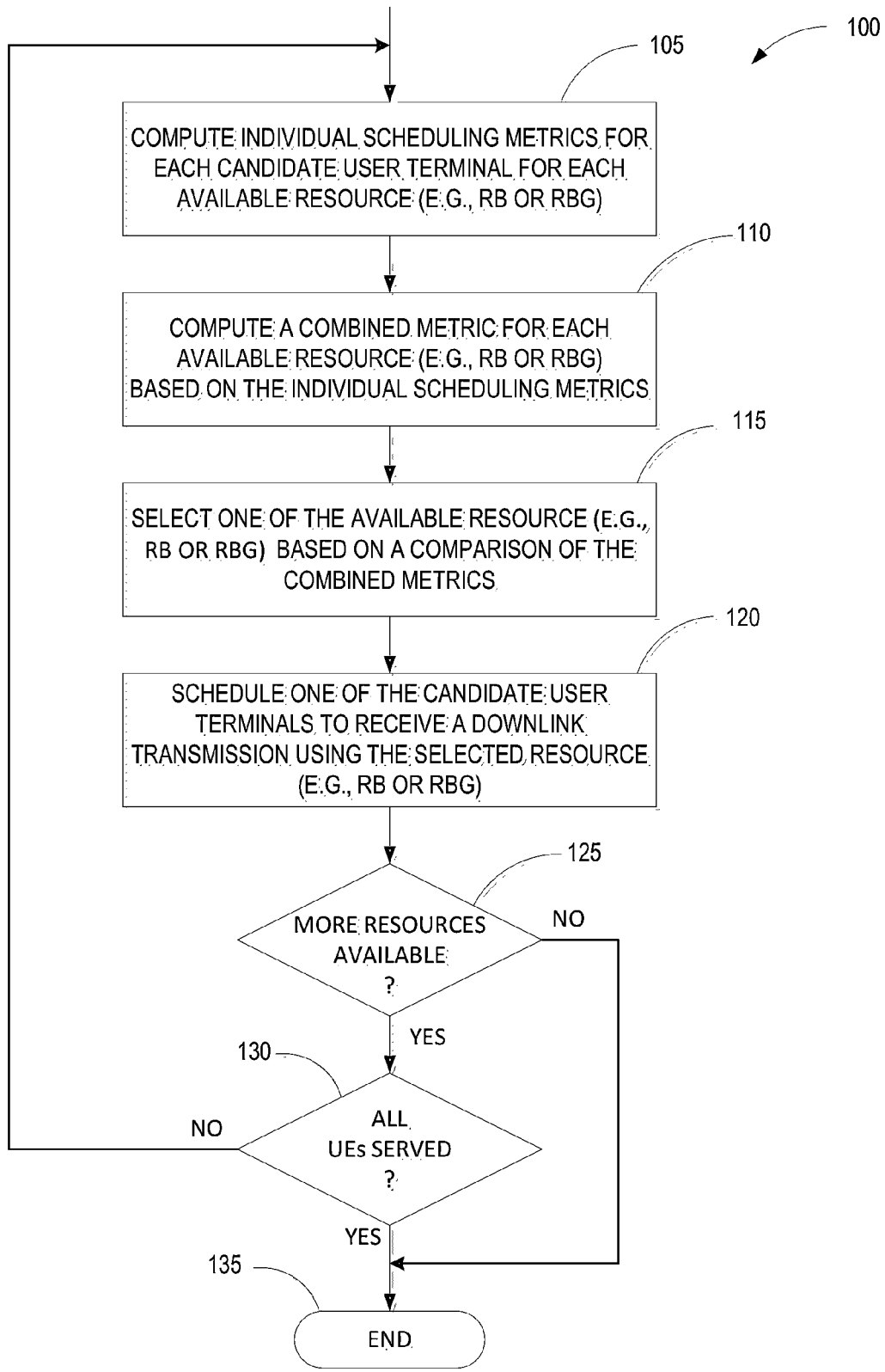
FIG. 4 illustrates an exemplary scheduling and resource allocation method according to an embodiment of the disclosure.

FIG. 4 illustrates an exemplary method 100 implemented by a base station 20 for scheduling downlink transmissions to a plurality of user terminals 40 over a shared downlink channel. The method 100 is performed during each scheduling interval, e.g., TTI. The base station 20 computes individual scheduling metrics for each candidate user terminal 40 for each available resource (e.g., RB or RBG) (block 105). Any scheduling metric may be used. As on example, the base station 20 may use a maximum throughput scheduling metric or proportionally fair scheduling metric.

After the individual scheduling metrics of the candidate user terminal 40 are determined, the base station 20 computes a resource metric for each available resource (e.g. RB or RBG) based on the individual scheduling metrics of the user terminals 40 (block 110). In one embodiment, the resource metric for each resource is computed by summing the corresponding individual scheduling metrics of the candidate user terminals 40. Depending on the specific scheduling metric, the resource metric may be computed based on the individual scheduling metric using different combining techniques After computing the resource metrics, the base station 20 selects one of the available resources based on a comparison of the resource metrics. In one embodiment, the base station 20 selects the resource that has the "least favorable or worst" resource metric. What is deemed "worst" will depend on the specific metric. For some metrics, higher values are better while for others lower values are better. In the case of the maximum throughput metric, a higher metric is deemed to be better. Therefore, the base station 20 selects the resource having the lowest resource metric, i.e., the lowest sum of the estimated throughputs.

After the resource is selected, a user terminal 40 is scheduled to receive a downlink transmission on the selected resource. The user terminal 40 to which the resource is allocated is selected based on the individual scheduling metrics of the user terminals. In one embodiment, the resource is allocated to the user terminal 40 having the "best" individual scheduling metric for the selected resource. Again, what is best will depend on the scheduling metric. If the individual scheduling metric is the expected throughput of the user terminals 40, the user terminal 40 with the "best" individual scheduling metric is the one with the highest throughput for the selected resource.

After the resource is allocated, the base station 20 determines whether more resources are available (block 125). If not, the process ends until the next scheduling interval. If more resources are available, the base station 20 determines whether all user terminals (UEs) 40 are served (block 130). If so, the process ends. If not, the allocation process (blocks 105-120) continues until all resources are allocated or until all user terminals 40 have been served.

Figure 5:
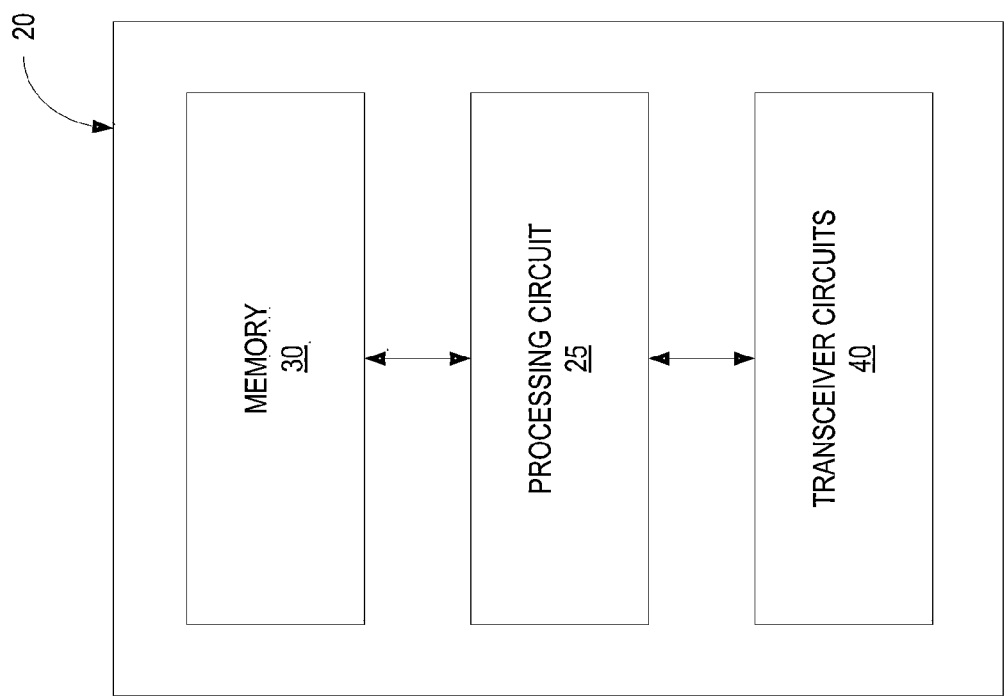
FIG. 5 illustrates an exemplary base station network implementing the user scheduling and resource allocation techniques as herein described.

FIG. 5 illustrates an exemplary base station 20 according to an embodiment of the disclosure. The base station 20 comprises a processing circuit 25, memory 30 and transceiver circuits 40. The processing circuit 25 processes signals transmitted from and received by the base station 20, and controls the operation of the base station 20. The processing circuit 25 may comprise one or more microprocessors, microcontrollers, hardware circuits, or a combination thereof. Memory 30 stores program code and data needed by the processing circuit 25 to operate as herein described. Memory 30 may comprise a combination of volatile and non-volatile memory devices. Memory 30 may include discrete memory devices as well as internal memory. Program code executed by the processing circuit 25 is typically stored in a non-volatile memory such as a read-only memory (ROM) or flash memory. Temporary data generated during operation may be stored in a volatile memory, such as a random access memory (RAM). Transceiver circuits 40 typically include receiver circuits for receiving data and transmit circuits for transmitting data. The transceiver circuits 40 may be configured to operate according to the LTE standard, or other applicable communications standard.

What is claimed is:

1. A method of scheduling downlink transmissions to one or more user terminals in a wireless communication network, said method comprising:
   computing an individual scheduling metric for each candidate user terminal for each available resource;
   computing a resource metric for each available resource by combining the individual scheduling metrics of two or more of the candidate user terminals;
   selecting one of the available resources based on a comparison of the resource metrics; and
   scheduling one of the candidate user terminals to receive a downlink transmission using the selected resource.

2. The method of claim 1 wherein computing an individual scheduling metric for each user terminal comprises computing an estimated throughput for each user terminal.

3. The method of claim 1 wherein computing an individual scheduling metric for each user terminal comprises computing a fairness metric for each user terminal.

4. The method of claim 1 wherein computing a resource metric for each resource comprises, for each resource, summing the corresponding individual scheduling metrics of the candidate user terminals.

5. The method of claim 1 further comprising, after allocating a first one of the resources, iteratively scheduling transmissions to one or more subsequent user terminals by:
   updating the individual scheduling metrics for each remaining candidate user terminal for each remaining resource;
   re-computing the resource metric for each remaining resource based on the updated individual scheduling metrics;
   selecting one of the remaining resources based on a comparison of the resource metrics; and
   scheduling one of the remaining candidate user terminals to receive a downlink transmission using the selected resource.

6. The method of claim 1 further comprising transmitting data to the scheduled user terminals using the selected resource.

7. A base station in a wireless communication network comprising:
   a transceiver circuit for communicating with user terminals; and
   a processing circuit operatively connected to said transceiver circuits for scheduling downlink transmission to said user terminals, said processing circuit being configured to:
   compute an individual scheduling metric for each candidate user terminal for each available resource;
   compute a resource metric for each available resource based on the individual scheduling metrics;
   select one of the available resources based on a comparison of the resource metrics; and
   schedule one of the candidate user terminals to receive a downlink transmission using the selected resource.

8. The base station of claim 7 wherein, to compute the individual scheduling metric for each user terminal, the processing is configured to compute an estimated throughput for each user terminal.

9. The base station of claim 7 wherein, to compute an individual scheduling metric for each user terminal, the processing circuit is configured to compute a fairness metric for each user terminal.

10. The base station of claim 7 wherein, to compute a resource metric for each resource, the processing circuit is configured to, for each resource, sum the corresponding individual scheduling metrics of the candidate user terminals.

11. The base station of claim 7 wherein, to select one of the available resources based on a comparison of the resource metrics, the processing circuit is configured to select the resource having the worst resource metric.

12. The base station of claim 8 wherein, to schedule one of the candidate user terminals to receive a downlink transmission using the selected resource, the processing circuit is configured to schedule a downlink transmission on the selected resource to the candidate user terminal having the best individual scheduling metric for the selected resource.

13. The base station of claim 7 wherein, after allocating a first one of the resources, the processing circuit is further configured to iteratively scheduling transmissions to one or more subsequent user terminals by:
 updating the individual scheduling metrics for each remaining candidate user terminal for each remaining resource;
 re-computing the resource metric for each remaining resource based on the updated individual scheduling metrics;
 selecting one of the remaining resources based on a comparison of the resource metrics; and
 scheduling one of the remaining candidate user terminals to receive a downlink transmission using the selected resource.

14. The base station of claim 8 wherein the processing circuit is further configured to transmit data to the scheduled user terminals using the selected resource.

* * * * *